(12) United States Patent
Yamazoe

(10) Patent No.: US 8,184,349 B2
(45) Date of Patent: May 22, 2012

(54) COLOR MANAGEMENT SYSTEM

(75) Inventor: Manabu Yamazoe, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 851 days.

(21) Appl. No.: 12/141,226

(22) Filed: Jun. 18, 2008

(65) Prior Publication Data

US 2008/0316513 A1 Dec. 25, 2008

(30) Foreign Application Priority Data

Jun. 20, 2007 (JP) ................................ 2007-162722

(51) Int. Cl.
*H04N 1/04* (2006.01)
(52) U.S. Cl. .......... 358/518; 358/1.9; 358/522; 358/523
(58) Field of Classification Search .................. 358/518, 358/1.9, 522, 523
See application file for complete search history.

(56) References Cited

U.S. PATENT DOCUMENTS

| | | | |
|---|---|---|---|
| 6,814,420 B2 | 11/2004 | Fujita et al. | 347/15 |
| 6,954,288 B2 | 10/2005 | Uekusa et al. | 358/1.9 |
| 6,980,326 B2 | 12/2005 | Tsuchiya et al. | 358/1.9 |
| 7,079,152 B2 | 7/2006 | Akiyama et al. | 345/589 |
| 7,158,671 B2 | 1/2007 | Yamazoe et al. | 382/167 |
| 7,266,239 B2 | 9/2007 | Akiyama et al. | 382/167 |
| 2004/0126010 A1 | 7/2004 | Yamazoe | 382/162 |
| 2005/0073707 A1 | 4/2005 | Yamazoe | 358/1.9 |
| 2007/0030498 A1 | 2/2007 | Hori et al. | 358/1.9 |
| 2007/0297667 A1* | 12/2007 | Umezawa | 382/162 |

FOREIGN PATENT DOCUMENTS

| | | |
|---|---|---|
| EP | 0 969 413 A2 | 1/2000 |
| GB | 1 595 122 | 8/1981 |
| JP | 53-123201 | 10/1978 |
| JP | 11-220630 | 8/1999 |
| JP | 2000-22973 A | 1/2000 |
| JP | 2000-253270 A | 9/2000 |
| JP | 2001-320594 A | 11/2001 |
| JP | 2004-236200 | 8/2004 |
| JP | 2004-276266 | * 10/2004 |
| JP | 2005-39364 | 2/2005 |
| JP | 2005-110089 A | 4/2005 |

* cited by examiner

*Primary Examiner* — Houshang Safaipour
(74) *Attorney, Agent, or Firm* — Fitzpatrick, Cella, Harper & Scinto

(57) ABSTRACT

The present invention provides a color conversion device that can be applied to a color management system. The color conversion device provides a color conversion device capable of generating a color conversion table used for color reproduction with high precision. The color conversion device generates a color conversion table that describes a correspondence relationship between color data in a first color space and color data in a second color space and corrects the correspondence relationship described in the color conversion table based on calorimetric values of color sample charts obtained by the reading of a plurality of the color sample charts. The color conversion device according to the present invention can correct the output values based on the calorimetric values of the color sample charts.

19 Claims, 9 Drawing Sheets

|  | R | G | B |
|---|---|---|---|
| CHART 1 | 20 | 23 | 28 |
| CHART 2 | 60 | 63 | 66 |
| CHART 3 | 132 | 125 | 128 |
| CHART 4 | 189 | 195 | 200 |

FIG.4

COLOR MANAGEMENT SYSTEM

BACKGROUND OF THE INVENTION

1. Field of the Invention

The present invention relates to a color conversion technique of digital color image data and, more particularly, to a color management system for reproducing the same color as that of a document in a scanner, color printer, and color monitor.

2. Description of the Related Art

Recently, accompanying the spread of personal computers, the technology of input devices, such as a scanner and digital still camera, and output devices, such as an inkjet printer, has been progressed. These products are widely spread in general homes as a consumer device because of its low price despite its high performance.

However, when a color document or image is printed or duplicated, as to the color reproduction, the color reproduced by an output device is not necessarily satisfactory. The main reason thereof is that while the colors dealt with in a computer are reproduced by additive color mixing of RGB, the colors dealt with in printing are reproduced by subtractive color mixing of CMYK. The additive color mixing of RGB is a method of representing a color with what is emitted from a monitor etc. itself and the subtractive process of CMYK is a method of representing a color with light reflected from a print etc. In general, in order to cope with the difference of the color reproduction method, color management using color profiles is carried out. In a color profile, color spaces of input and output devices are described. A color profile is information indispensable to color management for printing in correct colors as well as an ICC profile of a printer or inkjet sheet. In the color management, for example, color conversion processing between an input device and an output device is performed via a PCS color space. The PCS space is a "profile connection space", indicative of a CIELAB color space etc. In the color management, for color conversion processing, a source profile for converting the color space of an input device into the PCS and a destination profile for converting the PCS into the color space of an output device are used. That is, the color management manages the color characteristics of an input device and an output device as a profile.

FIG. 8 is a block diagram showing a configuration example of a system that realizes color management of a scanner and a printer.

A color conversion device 802 receives image data from a scanner 801, which is an input device. Next, the color conversion device 802 carries out color conversion of the received image data and outputs the result to a printer 803, which is an output device. The color conversion device 802 comprises a source profile of a scanner (scanner profile) and a destination profile of a printer (printer profile). The color conversion device 802 converts the color space of scanner (device RGB) into the PCS color space using the source profile (scanner profile). Next, the color conversion device 802 converts the PCS color space into the color space of printer (for example, CMYK) using the destination profile (printer profile).

FIG. 9 is a block diagram showing a configuration example of a system that realizes color management of a scanner and a monitor.

A color conversion device 902 receives image data from a scanner 901, which is an input device. Next, the color conversion device 902 carries out color conversion of the received image data and outputs the result to a monitor 903, which is an output device. The color conversion device 902 comprises a source profile of a scanner (scanner profile) and a destination profile of a monitor (monitor profile). The color conversion device 902 converts the color space of scanner (device RGB) into the PCS color space using the source profile (scanner profile). Next, the color conversion device 902 converts the PCS color space into the color space of monitor (for example, sRGB monitor) using the destination profile (monitor profile).

Each profile described above is represented by a three-row×three-column matrix or a three-dimensional lookup table (hereinafter, referred to as 3D-LUT). When a profile cannot be represented by a three-row×three-column matrix, it is represented by a 3D-LUT. The color conversion processing 53-123201 and using a 3D-LUT is disclosed in Japanese Patent Laid-Open No. 53-123201 (1978) and Japanese Patent Laid-Open No. 2000-022973. In the tetrahedron interpolation disclosed in these patent documents, a linear interpolation operation is carried out using four pieces of grid point data.

The source profile (scanner profile) links the device RGB for a plurality of color sample charts with calorimetric values XYZ, for example, as shown in formula (1)

$$\begin{pmatrix} X \\ Y \\ Z \end{pmatrix} = \begin{pmatrix} m11 & m12 & m13 \\ m21 & m22 & m23 \\ m31 & m32 & m33 \end{pmatrix} \begin{pmatrix} R \\ G \\ B \end{pmatrix} \quad (1)$$

With a device having a high linearity, it is possible to link the device RGB with the calorimetric values XYZ using the primary matrix described above. In actuality, however, the linking is performed including the n-th term of the device RGB in most cases. When the second term of the device RGB is included, the device RGB for the plurality of color sample charts and the calorimetric values XYZ are linked, for example, as shown in formula (2).

$$\begin{pmatrix} X \\ Y \\ Z \end{pmatrix} = (M_{ij}) \begin{pmatrix} R \\ G \\ B \\ R^2 \\ G^2 \\ B^2 \\ RG \\ GB \\ BR \\ C \end{pmatrix} \quad (i=1 \ldots 10, \; j=1 \ldots 3) \quad (2)$$

Here, $M_{ij}$ is a quadratic matrix coefficient. C is a constant term and used when necessary. When the device RGB and the calorimetric values XYZ are linked using the n-order matrix, the profile is represented by a 3D-LUT in general.

In the conventional technique, a 3D-LUT is used, which performs linking using a high-order matrix. However, a matrix is defined so as to achieve total optimization, and therefore, partially, it cannot necessarily achieve an excellent color conversion precision. Because of this, a technique for further improving the color conversion precision in a specific color gamut has been proposed. For example, in Japanese Patent Laid-Open No. 2001-320594, a technique for improving the color conversion precision in a gray region has been disclosed. For this technique, there are provided a color conversion table A in which reference values are defined at predetermined grid intervals and a color conversion table B for the gray region in which reference values are defined at grid intervals smaller than the predetermined grid intervals. Then, by switching the color conversion tables in accordance with a color gamut of the input side, the color conversion precision in the gray region is improved.

In Japanese Patent Laid-Open No. 2000-253270, based on an initial color conversion table corresponding to grid points, a color conversion table is corrected by weighting based on the output values, the colorimetric values, and the distance to the grid point using a plurality of color patches in the vicinity of the grid point.

The method disclosed in Japanese Patent Laid-Open No. 2001-320594 has a problem that the color conversion processing is complicated, such as the processing of linear interpolation branches in accordance with a color gamut, because the color conversion tables are switched in accordance with the color gamut of an input device. Further, with the method disclosed in Japanese Patent Laid-Open No. 2000-253270, although the color conversion precision can be improved partially, a high-precision color conversion cannot be realized in a specific color gamut.

SUMMARY OF THE INVENTION

An object of the present invention is to provide a color conversion device that can be applied to a color management system and which comprises a color conversion table capable of realizing a high-precision color conversion in a specific color gamut.

The present invention relates to a color conversion device. The color conversion involves a color conversion table and a correction component. The color conversion table describes a correspondence relationship between first color data in a first color space and second color data in a second color space. The correction component corrects the correspondence relationship described in the color conversion table based on colorimetric values of color sample charts obtained by reading a plurality of the color sample charts.

Furthermore, the present invention relates to a color conversion method. The color conversion method involves the steps of: generating a color conversion table that describes a correspondence relationship between first color data in a first color space and second color data in a second color space; and correcting the correspondence relationship described in the color conversion table based on calorimetric values of color sample charts obtained by reading a plurality of the color sample charts.

Furthermore, the present invention relates to a computer-readable recording medium. The medium records a computer program for causing a computer to execute the steps of: generating a color conversion table that describes a correspondence relationship between first color data in a first color space and second color data in a second color space; and correcting the correspondence relationship described in the color conversion table based on colorimetric values of color sample charts obtained by reading a plurality of the color sample charts.

According to the present invention, when the color conversion table for converting the first color space into the second color space is generated, the color conversion table is corrected based on the actual colorimetric values of the color sample chart, and therefore, the color conversion precision in a color gamut important for color reproduction can be improved.

Further features of the present invention will become apparent from the following description of exemplary embodiments (with reference to the attached drawings).

BRIEF DESCRIPTION OF THE DRAWINGS

FIG. 4 is a diagram showing device RGB values for each color sample chart obtained as a result of reading a gray color sample chart by a scanner;

DESCRIPTION OF THE EMBODIMENTS

Embodiments of the present invention will be described below in detail with reference to drawings.

First Embodiment

Figure 1:
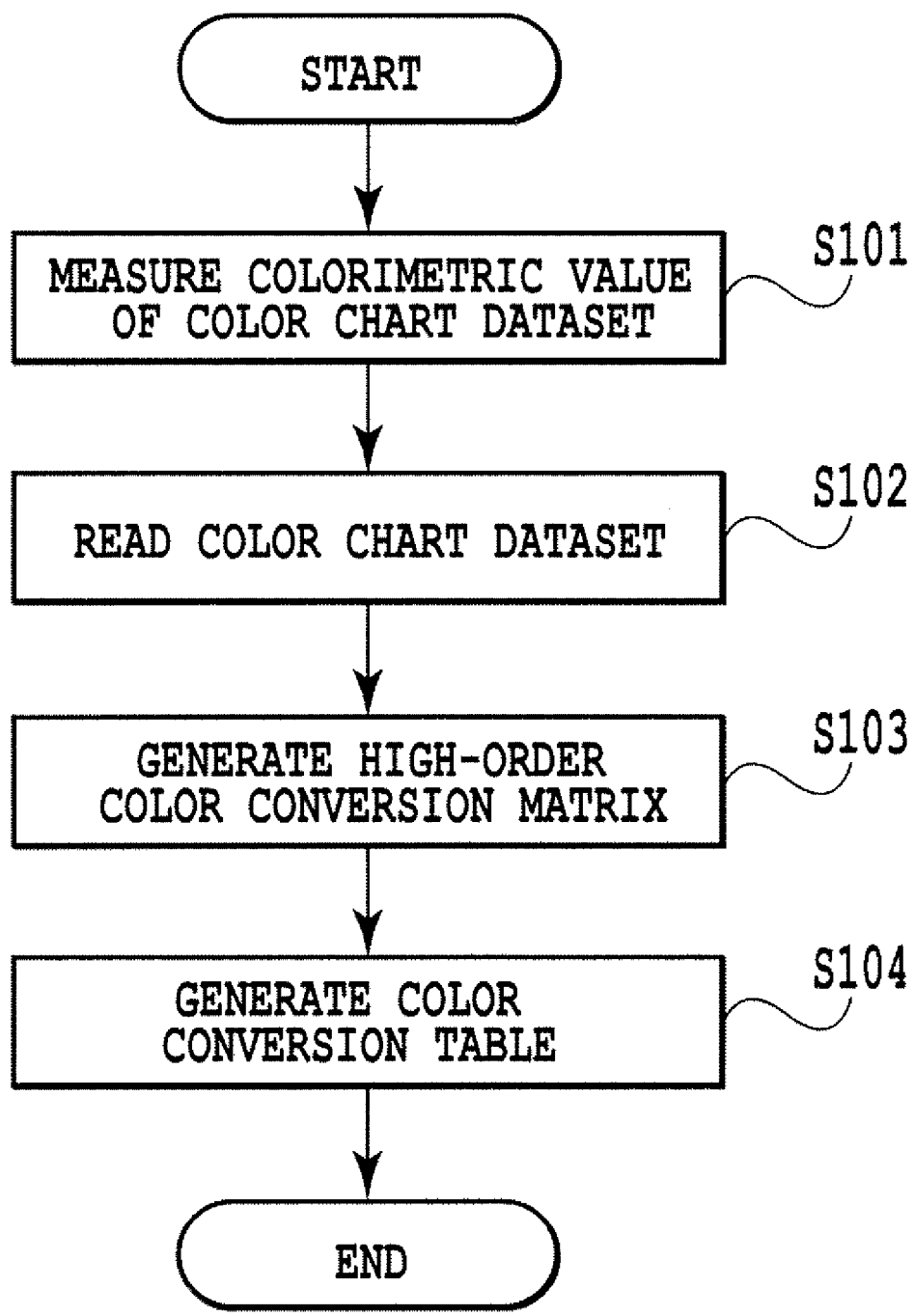
FIG. 1 is a flowchart showing a flow of processing for generating a source profile of a scanner (scanner profile)

FIG. 1 is a flowchart showing a flow of processing for generating a source profile of a scanner (scanner profile).

In S101, a calorimeter performs colorimetry of a plurality of color sample charts prepared in advance. The colorimetric values are output to a color conversion device.

In S102, a scanner reads each color sample chart, obtains device RGB values, and outputs them to the color conversion device. The color conversion device is implemented by means of installation of a program that can execute processing in FIG. 1 and FIG. 2 as a profile creation application in a personal computer.

In S103, the color conversion device generates a high-order color conversion matrix that makes total energy minimum (for example, the color difference is minimum) based on the device RGB values obtained in S102 and the calorimetric values obtained in S101.

In S104, the color conversion device divides the color space of the scanner by a predetermined number of grid points (for example, 17 grid points dispersed in the entire color gamut of the scanner) and calculates output values XYZ corresponding to the device RGB of each grid point using the color conversion matrix generated in S103. Subsequently, the color conversion device generates a color conversion table that describes a correspondence relationship between device RGB and output values XYZ. That is, the color conversion table is a table that describes a correspondence relationship between first color data in a first color space (for example, device RGB) and second color data in a second color space (CIEXYZ). As an example of a method of generating a color conversion matrix, there is a method disclosed in Japanese Patent Laid-Open No. 2005-110089. This method utilizes a pseudo inverse matrix. In order to generate a color conversion matrix, other various publicly known methods can be used. In addition, the color conversion device may utilize a mapping instead of a color conversion matrix. Consequently, in the present embodiment, as shown in formula (3), the device RGB and the output values XYZ corresponding to the device RGB are linked by a mapping F.

$$(X,Y,Z)=F(R,G,B) \quad (3)$$

In the above formula, CIEXYZ is used as output values of the source profile, however, CIELab may be used. Here, the CIEXYZ is a method for describing a color by three primary colors XYZ defined by the CIE. The CIELab is a color space devised so that the CIEXYZ can be easily understood perceptively.

Figure 2:
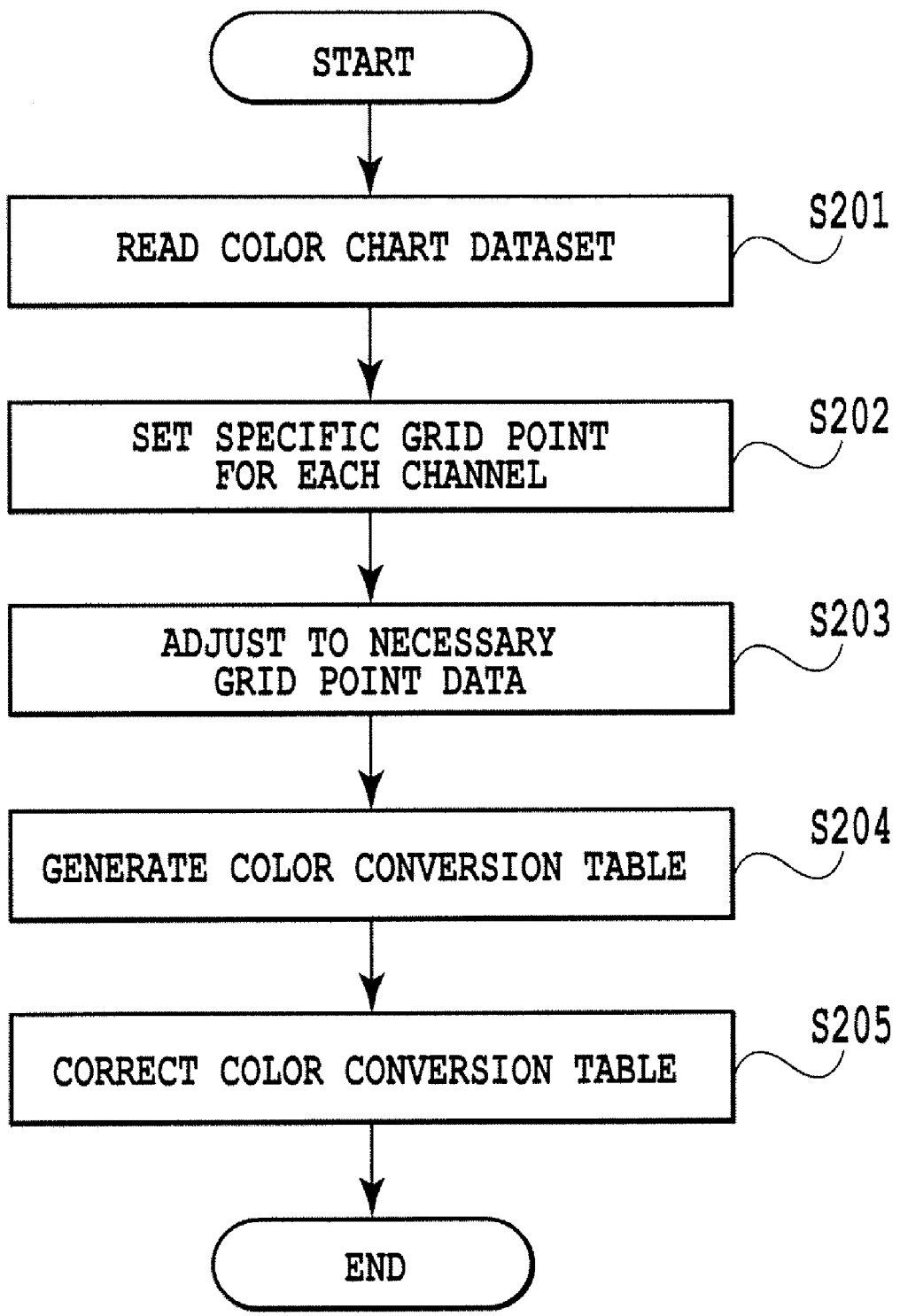
FIG. 2 is a flowchart showing a flow of processing for generating and correcting a color conversion table.

FIG. 2 is a flowchart showing a flow of processing for generating a color conversion table the reproductivity of specific grid points of which has been improved in the present embodiment.

Figure 3:
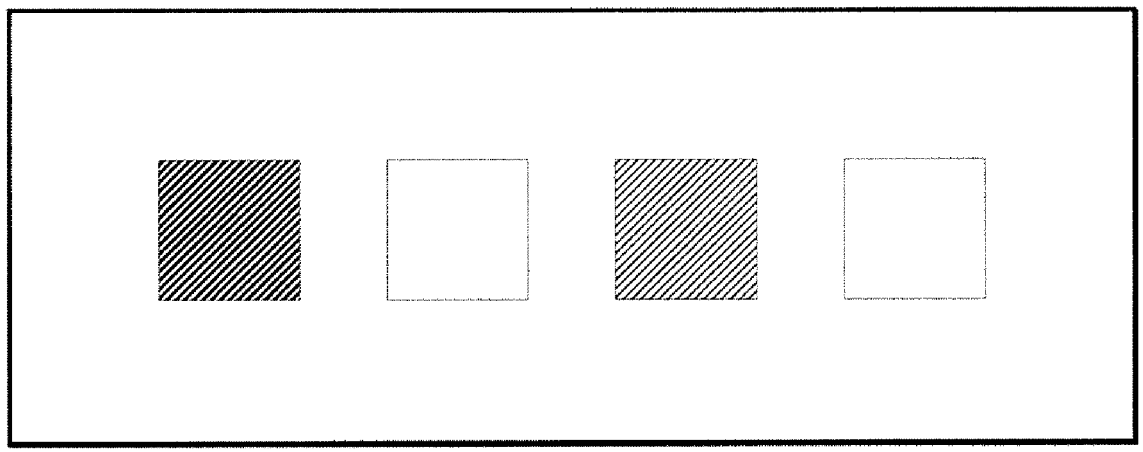
FIG. 3 is a diagram showing a color sample chart.

FIG. 3 is a diagram showing a color sample chart for realizing a high-precision matching.

In order to simplify description, it is assumed that color sample charts used in the present embodiment are gray color sample charts (color sample charts 1 to 4) of different density. The color sample charts may be those indicative of specific memory colors (skin color, green, blue) or corporate colors used by such as a company logo.

In S201, the colorimeter reads the gray color sample charts of different density and obtains calorimetric values.

FIG. 4 is a diagram showing device RGB values for each color sample chart obtained as a result of the reading of the gray color sample charts by the scanner.

Numeric values shown in FIG. 4 are device RGB values whose R channel, G channel, and B channel, each of them is expressed by eight bits, are transformed into decimal numbers. Referring to FIG. 4, the values of the R channel, G channel, and B channel are values between 0 and 255. For example, the device RGB values of the color sample chart 1 are (20, 23, 28). As can be seen from FIG. 4, even if the color sample chart is neutral gray, the device RGB values are not necessarily indicative of gray.

In the source profile described in the form of a 3D-LUT, a correspondence relationship between the grid point data obtained by equally dividing all the color gamut's of the device RGB by a specific number of grid points and the output values for the grid point data is described. In contrast to this, in the present embodiment, the device RGB values shown in FIG. 4 are used as specific grid point data and a correspondence relationship between the specific grid point data and the output values for the specific grid point data is described in the color conversion table.

In S202, the color conversion device sets specific grid point data for each channel based on the device RGB values shown in FIG. 4.

Figure 5:
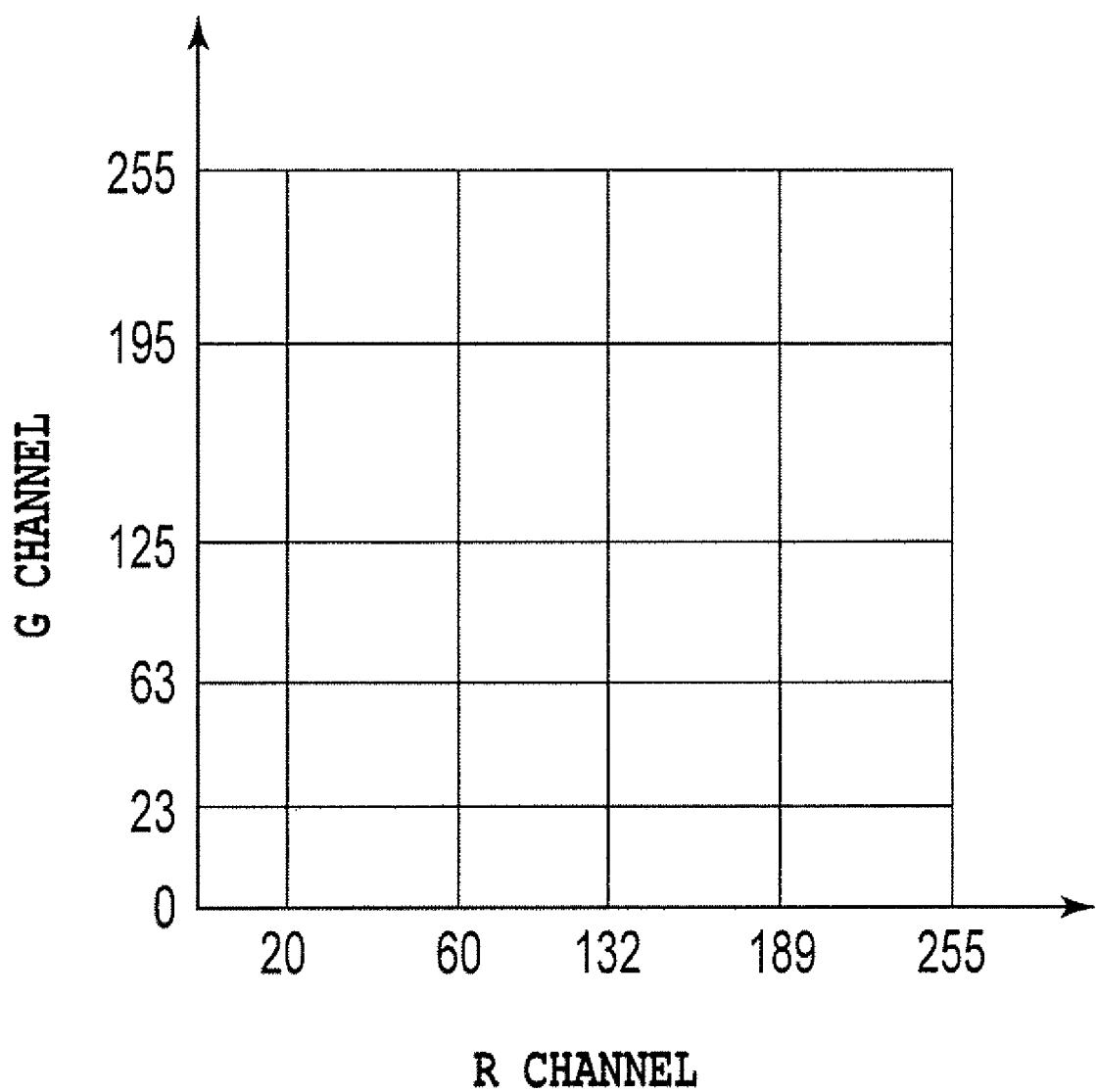
FIG. 5 is a diagram showing specific grid point data of a G channel and an R channel.

FIG. 5 is a diagram showing the specific grid point data of the G channel and the R channel.

In FIG. 5, a plane consisting of the specific grid point data of the R channel and the G channel is shown, however, actually, it will be a cube consisting of the specific grid point data of the R channel, the G channel, and the B channel (device RGB values).

When N color sample charts are given, N pieces of grid point data are generated unless the device RGB values are duplicated. In addition, the minimum value 0 and the maximum value 255 are necessary as grid point data.

In S203, the color conversion device sets grid point data necessary to generate a color conversion table. If it is assumed that the number of pieces of grid point data necessary to generate a color conversion table is M, required grid point data is added. For example, when four kinds of color sample charts are given, six pieces of grid point data are generated, and if nine pieces of grid point data are necessary in order to generate a color conversion table, three pieces of grid point data need to be added.

Figure 6:
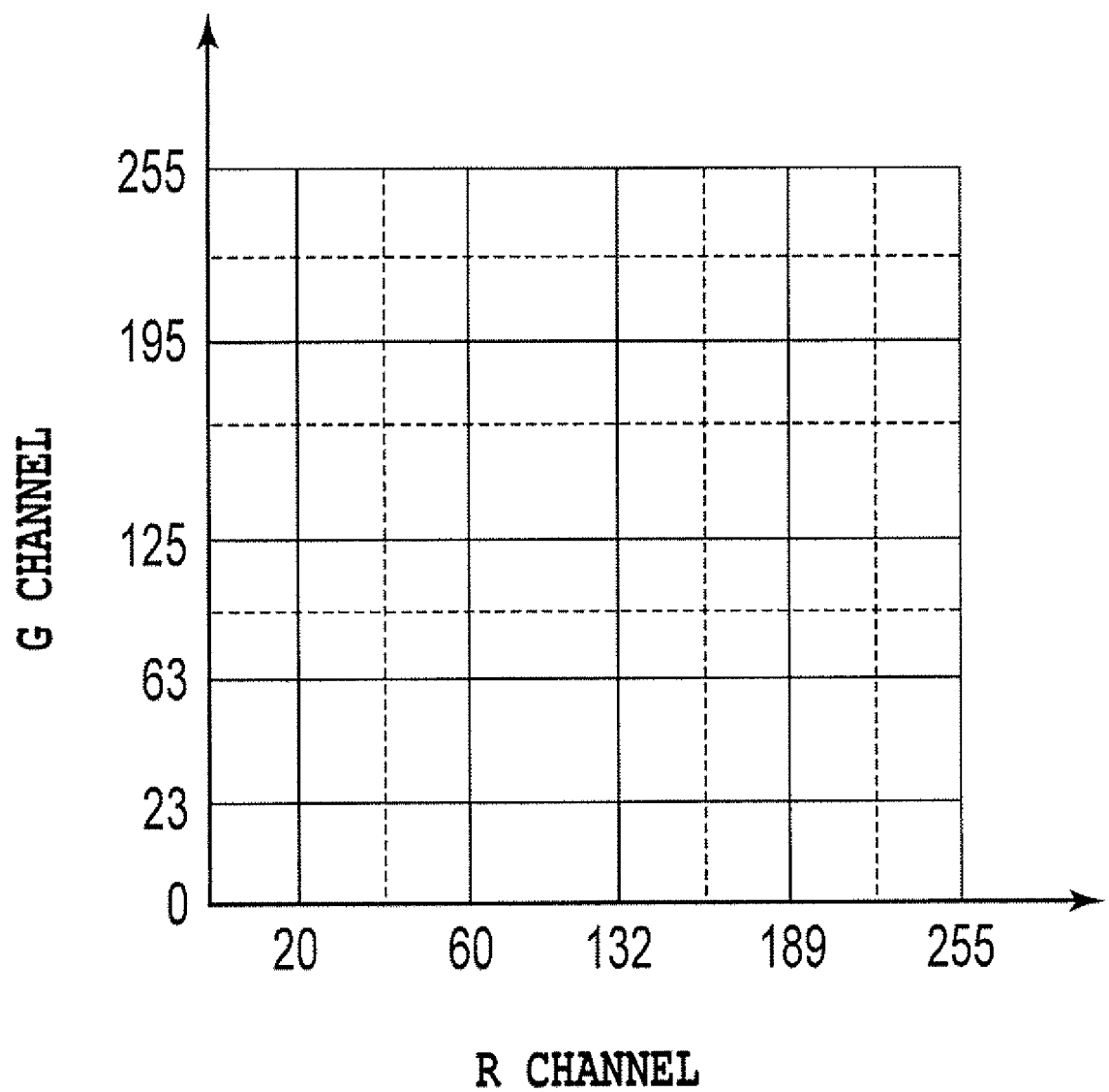
FIG. 6 is a diagram showing the final grid point data including added grid point data in a plane.

FIG. 6 is a diagram representing the final grid point data including added grid point data in a plane. By adding the grid point data to the position denoted by the broken line shown in FIG. 6, the number of pieces of final grid point data is increased to nine. Since it is necessary to add three pieces of grid point data to each channel, grid point data is set arbitrarily to the positions having a large grid point interval in between. For example, the position at which the grid point data to be added is set may be simply the center position between the original grid point data, or the grid point data may be set based on a spline curve, which is an approximation of the original grid point data.

Figure 7:
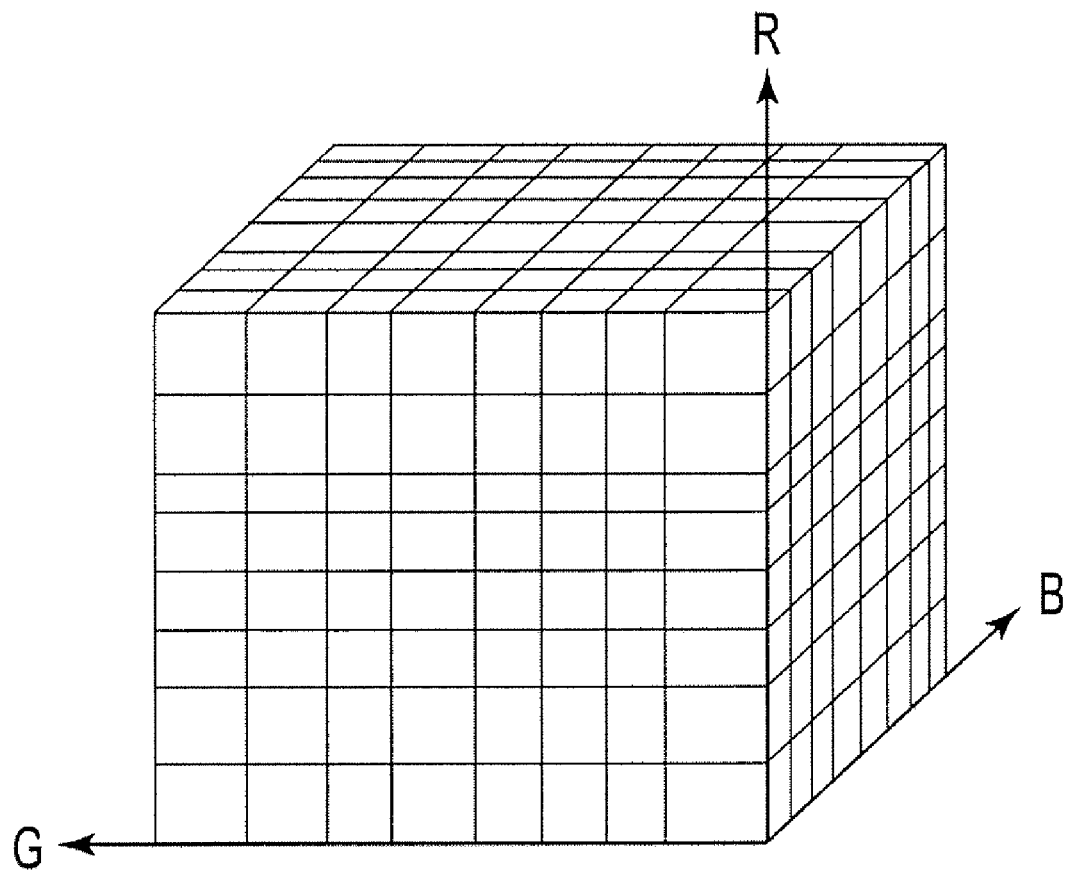
FIG. 7 is a diagram showing the final grid point data including added grid point data in a cube.
Figure 8:
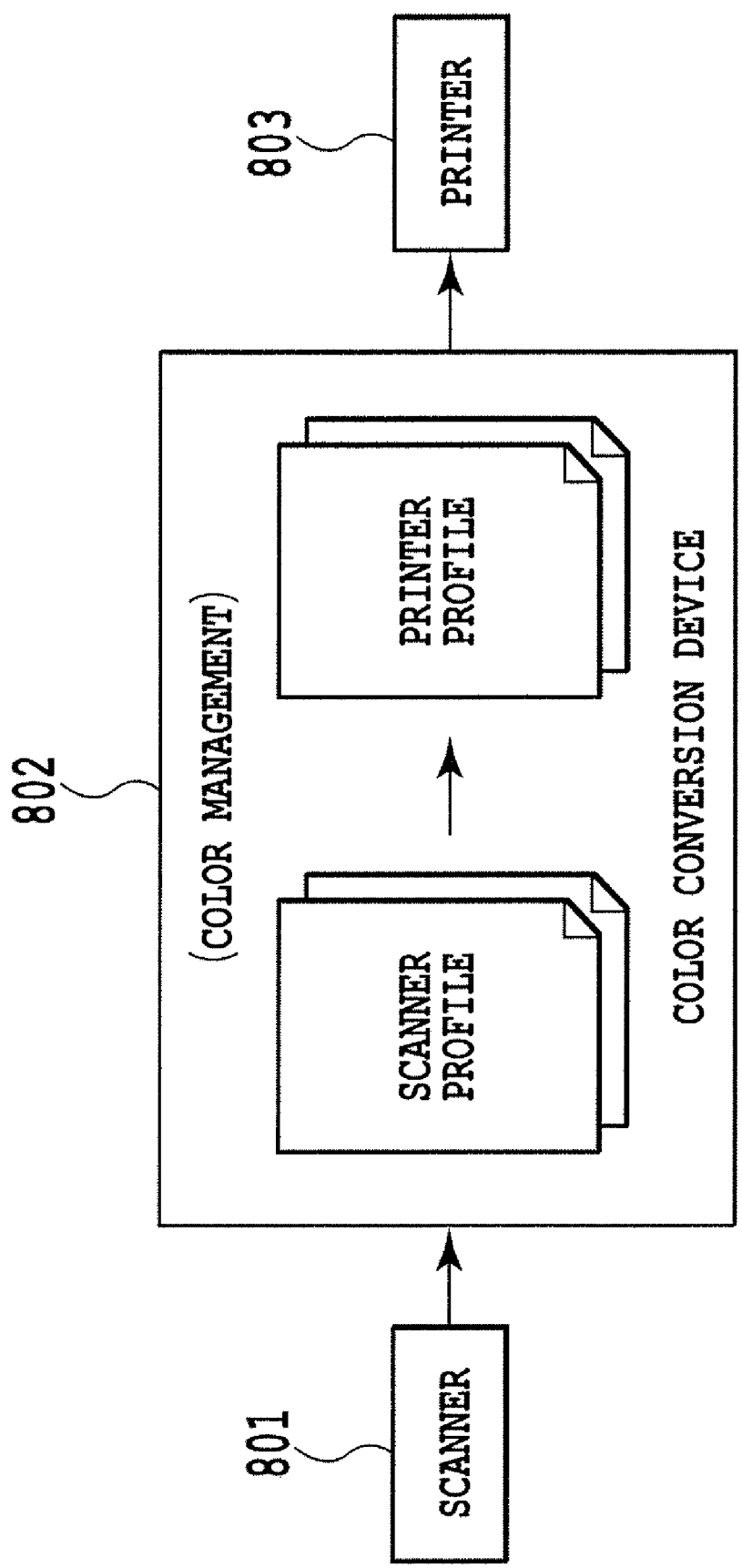
FIG. 8 is a block diagram showing a configuration example of a system that realizes color management of a scanner and a printer.
Figure 9:
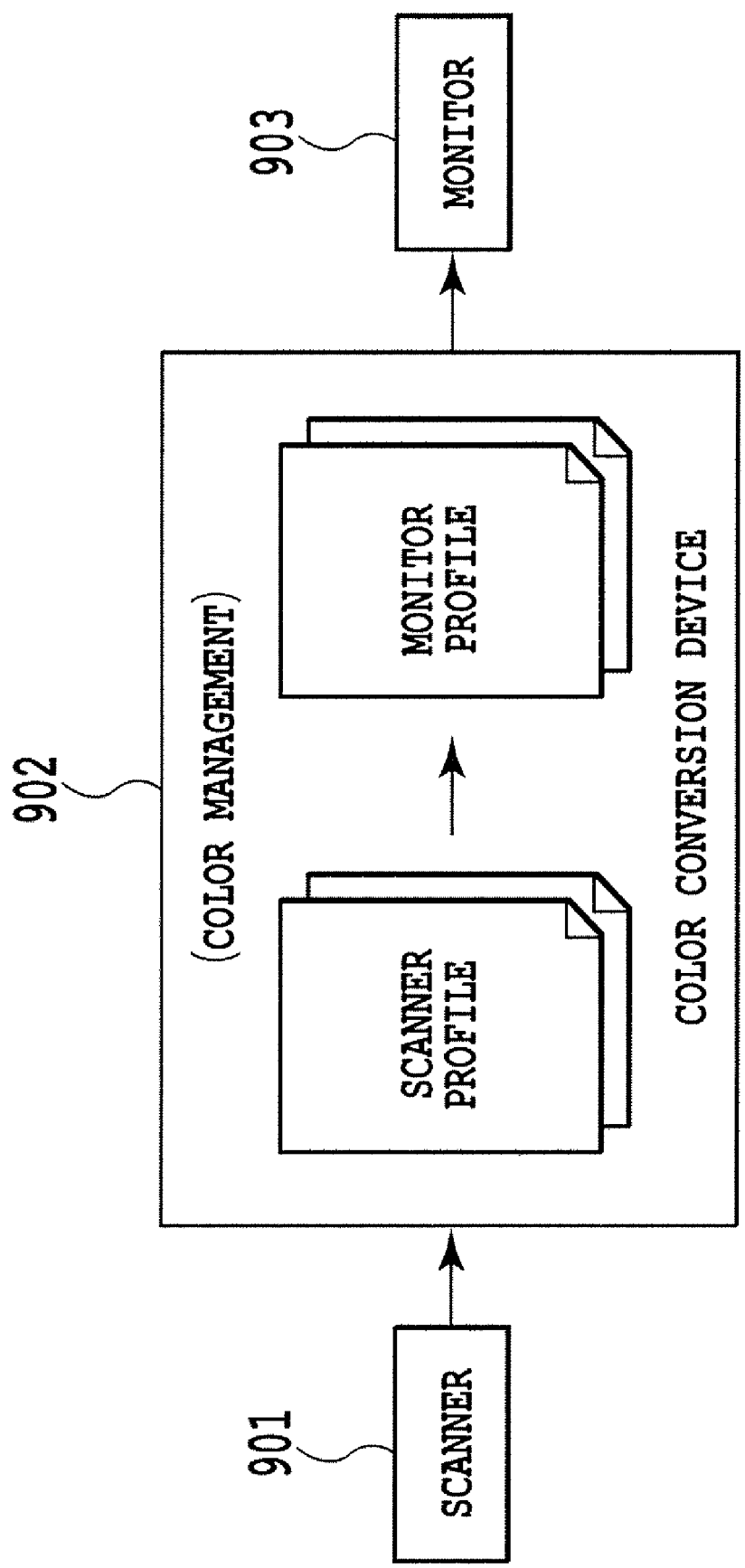
FIG. 9 is a block diagram showing a configuration example of a system that realizes color management of a scanner and a monitor.

FIG. 7 is a diagram representing the final grid point data including the added grid point data in a cube.

In the device color space, the intersections of planes constituted by each line are the grid point data. In general, it is desirable that the intervals of the grid point data be uniform from the standpoint of the processing speed in the linear interpolation processing, and, for example, if the method disclosed in Japanese Patent Laid-Open No. 2000-022973 is used, it is also possible to realize high-speed interpolation processing for arbitrary grid point data the intervals of grid points of which are not uniform. It is also possible to realize the linear interpolation processing of 3D-LUT even by setting different grid point data at each channel.

In S204, the output values XYZ are obtained using the device RGB values of each grid point and the mapping F (formula 3) described above and a color conversion table that describes a correspondence relationship between the device RGB values and the output values XYZ is generated.

In S205, part of the correspondence relationship of described in the color conversion table generated in S204 is corrected. That is, in S205, the output values XYZ corresponding to the specific grid point data obtained from a specific color sample chart among all of the grid point data are corrected based on the actual calorimetric values of the color sample chart. The reason is that the mapping F does not reflect the actual colorimetric values of the color sample chart partially because it is optimized for the whole of the color gamut of the scanner.

In the present embodiment, the output values XYZ corresponding to the specific grid point data obtained from the color sample chart of the color for which a high-precision mapping is desired are corrected based on the actual calorimetric values of the color sample chart. Further, when the amount of correction of the output values XYZ corresponding to the specific grid point data is large, the output values XYZ corresponding to the neighboring grid point data may be corrected in accordance with its magnitude.

In the present embodiment, after the color conversion table that describes the correspondence relationship between arbitrary grid point data and the output values XYZ corresponding thereto is generated, the output values XYZ corresponding to the specific grid point data are corrected based on the actual calorimetric values of the color sample chart for the color conversion table. Due to this, it is possible to provide a color conversion table that realizes a high-precision mapping in a region important for color reproduction.

Second Embodiment

In the first embodiment, details are described using an example, in which the source profile is generated, however, the output color space does not necessarily need to be the PCS color space in the color conversion table. For example, it is also possible to map an input device RGB other than that of a scanner to a standard xRGB color space (for example, sRGB). In this case, a color conversion table is generated using a mapping G instead of the mapping F described above.

$$(R,G,B)\text{standard}=G(R,G,B)\text{device} \quad (4)$$

In the second embodiment, as in the first embodiment, grid point data is generated from a color sample chart that realizes a high-precision mapping and the number of pieces of grid point data is set to a number finally required. After the color conversion table is generated using the grid point data and the output values corresponding thereto, the output values corresponding to the specific grid point data may be corrected using the actual colorimetric values (XRGB values).

As described above, according to the present invention, the first color space depends on a device, however, the second color space does not.

Other Embodiments

A processing method is also included in the scope of the embodiments described above, in which a program that causes the configuration in the already described embodiments to work so that the functions already described in the embodiments are realized is recorded in a recording medium, then the program recorded in the recording medium is read as a code and executed in a computer. The recording medium is a computer-readable recording medium. The program itself is included in the above-described embodiments as well as the recording medium in which the above-described program is included. As the recording medium, a floppy disc, hard disc, optical disc, magneto-optical disc, CD-ROM, magnetic tape, nonvolatile memory card, and ROM can be used. Besides the program recorded in the already described recording medium, which executes processing for itself, those that operate on an OS in cooperation with other software, the function of an extension board, and execute the function of the already described embodiment are also included in the scope of the already described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-162722, filed Jun. 20, 2007, which is hereby incorporated by reference herein in its entirety.

What is claimed is:

1. A color conversion device comprising:
   a color conversion table for describing a correspondence relationship between first color data in a first color space and second color data in a second color space; and
   a correction component for correcting the correspondence relationship described in the color conversion table based on colorimetric values of a color sample chart obtained by reading a plurality of the color sample charts,
   wherein in the color conversion table, specific grid point data of a color space generated from the color sample chart and output values corresponding to the specific grid point data are described based on a color conversion matrix or a mapping that links the first color space to the second color space, and
   wherein the specific grid point data, intervals of grid points of which are not uniform, is located in the first color space.

2. The color conversion device of claim 1, wherein the correction component corrects the second color data described in the color conversion table based on the colorimetric values.

3. The color conversion device of claim 1, wherein the first color space is a color space that depends on a device and the second color space is a color space that does not depend on a device.

4. The color conversion device of claim 2, wherein the first color space is a color space that depends on a device and the second color space is a color space that does not depend on a device.

5. The color conversion device of claim 1, wherein the color sample chart indicates a gray region or a specific memory color.

6. The color conversion device of claim 2, wherein the color sample chart indicates a gray region or a specific memory color.

7. The color conversion device of claim 3, wherein the color sample chart indicates a gray region or a specific memory color.

8. The color conversion device of claim 1, wherein the correction component corrects the output values based on the colorimetric values of the color sample chart.

9. A color conversion method comprising the steps of:
   generating a color conversion table for describing a correspondence relationship between first color data in a first color space and second color data in a second color space; and
   correcting the correspondence relationship described in the color conversion table based on colorimetric values of a color sample chart obtained by reading a plurality of the color sample charts,
   wherein the color conversion table describes specific grid point data of a color space generated from the color sample chart and output values corresponding to the specific grid point data, based on a color conversion matrix or a mapping that links the first color space to the second color space, and
   wherein the specific grid point data, intervals of grid points of which are not uniform, is located in the first color space.

10. The color conversion method of claim 9, wherein in the correction step, the second color data described in the color conversion table is corrected based on the colorimetric values.

11. The color conversion method of claim 9, wherein the first color space is a color space that depends on a device and the second color space is a color space that does not depend on a device.

12. The color conversion method of claim 10, wherein the first color space is a color space that depends on a device and the second color space is a color space that does not depend on a device.

13. The color conversion method of claim 9, wherein the color sample chart indicates a gray region or a specific memory color.

14. The color conversion method of claim 10, wherein the color sample chart indicates a gray region or a specific memory color.

15. The color conversion method of claim 11, wherein the color sample chart indicates a gray region or a specific memory color.

16. The color conversion method of claim 9, wherein in the correction step, the output values are corrected based on the colorimetric values of the color sample chart.

17. A non-transitory computer-readable recording medium having computer-executable instructions for performing a color conversion method, the method comprising the steps of:
generating a color conversion table for describing a correspondence relationship between first color data in a first color space and second color data in a second color space; and
correcting the correspondence relationship described in the color conversion table based on colorimetric values of a color sample chart obtained by reading a plurality of the color sample charts,
wherein in the color conversion table, specific grid point data of a color space generated from the color sample chart and output values corresponding to the specific grid point data are described based on a color conversion matrix or a mapping that links the first color space to the second color space, and
wherein the specific grid point data, intervals of grid points of which are not uniform, is located in the first color space.

18. A color conversion device comprising:
a generating component constructed to generate a color conversion table for describing a correspondence relationship between first color data in a first color space that depends on a device and second color data in a second color space that does not depend on a device, by using a mapping based on scanned data in the first color space scanned by a scanner and colorimetric data in the second color space performed colorimetry by a colorimeter; and
a correction component constructed to correct a correspondence relationship of specific grid point data and output values corresponding to the specific grid point data described in the color conversion table based on colorimetric values of a color sample chart of gray, memory colors or corporate colors obtained by performing colorimetry of the color sample chart of gray, memory colors or corporate colors, and
wherein the specific grid point data, intervals of grid points of which are not uniform, is located in the first color space.

19. A color conversion method comprising:
generating a color conversion table for describing a correspondence relationship between first color data in a first color space that depends on a device and second color data in a second color space that does not depend on a device, by using a mapping based on scanned data in the first color space scanned by a scanner and colorimetric data in the second color space performed colorimetry by a colorimeter; and
correcting a correspondence relationship of specific grid point data and output values corresponding to the specific grid point data described in the color conversion table based on colorimetric values of a color sample chart of gray, memory colors or corporate colors obtained by performing colorimetry of the color sample chart of gray, memory colors or corporate colors, and
wherein the specific grid point data, intervals of grid points of which are not uniform, is located in the first color space.

* * * * *